United States Patent
Nagashima et al.

(10) Patent No.: US 7,551,260 B2
(45) Date of Patent: Jun. 23, 2009

(54) LIQUID CRYSTAL DISPLAY DEVICE

(75) Inventors: Osamu Nagashima, Mobara (JP); Kurando Shinba, Mobara (JP); Eisuke Hatakeyama, Mobara (JP); Hikaru Ito, Mobara (JP); Masataka Natori, Chiba (JP)

(73) Assignee: Hitachi Displays, Ltd., Chiba-ken (JP)

( * ) Notice: Subject to any disclaimer, the term of this patent is extended or adjusted under 35 U.S.C. 154(b) by 129 days.

(21) Appl. No.: 11/898,276

(22) Filed: Sep. 11, 2007

(65) Prior Publication Data
US 2008/0062372 A1  Mar. 13, 2008

(30) Foreign Application Priority Data
Sep. 11, 2006  (JP) .............................. 2006-245328

(51) Int. Cl.
*G02F 1/13* (2006.01)

(52) U.S. Cl. .......................... 349/192; 349/54

(58) Field of Classification Search ............ 349/54, 349/192
See application file for complete search history.

(56) References Cited

U.S. PATENT DOCUMENTS

2005/0157241 A1* 7/2005 Sasuga et al. ............... 349/149

FOREIGN PATENT DOCUMENTS

JP  2001-324721  2/2001

* cited by examiner

*Primary Examiner*—David Nelms
*Assistant Examiner*—Phu Vu
(74) *Attorney, Agent, or Firm*—Reed Smith LLP; Juan Carlos A. Marquez, Esq.

(57) ABSTRACT

A liquid crystal display device is provided to prevent gas bubbles from being generated due to the contact of an inspection probe. An insulating film composed of a gate insulating film and a protection film is formed on a gate wire and wire inspection terminal, and is partially removed from an upper surface of the wire inspection terminal to form a concave portion exposing the top surface of the wire inspection terminal. A transparent conductive film made of ITO is formed on the insulating film, including the concave portion on the wire inspection terminal. The transparent conductive film is electrically connected with the wire inspection terminal at the concave portion, and formed extending onto the gate insulating film and protection film on the opposite side of a scanning wire of the wire inspection terminal. Disconnection inspection is performed using the extending portion as a contact portion with an inspection probe.

16 Claims, 5 Drawing Sheets

LIQUID CRYSTAL DISPLAY DEVICE

CLAIM OF PRIORITY

The present application claims priority from Japanese Application JP 2006-245328 filed on Sep. 11, 2006, the content of which is hereby incorporated by reference into this application.

BACKGROUND OF THE INVENTION

1. Field of the Invention

The present invention relates to a liquid crystal display device. More particularly, the present invention relates to a liquid crystal display device characterized by the structure of a wire inspection terminal of a thin-film transistor substrate.

2. Description of the Related Art

A liquid crystal display device is composed of a liquid crystal display panel, a drive circuit, and a back light, etc. as required. The liquid crystal display panel is formed by laminating first and second substrates, and a liquid crystal layer is encapsulated in an opposing gap between inner surfaces, i.e., main surfaces thereof. A plurality of scanning wires and a plurality of data wires are formed on the main surface of the first substrate, the data wires intersecting with the scanning wires through an insulating layer. A pixel is formed at an intersection of a scanning wire and a data wire, and a pixel area (effective display area) is formed by arranging pixels in matrix form. Aluminum is suitably used for these wires.

FIG. 4 is a schematic plan view showing a configuration of a liquid crystal display panel. In FIG. 4, SUB1 shows the first substrate and SUB2 the second substrate. A plurality of scanning wires GL and a plurality of data wires DL are formed on the first substrate SUB1, the data wires DL being insulated from and intersecting with the scanning wires GL. A wire inspection terminal CKP (inspection pad), which is circled and indicated by an arrow A, is formed at the end of each scanning wire GL. The wire inspection terminal CKP includes a contact portion with an inspection probe. A scanning wire drive circuit chip GD is connected to the other end of each scanning wire GL.

A plurality of data wires DL are formed so as to intersect with the above-mentioned scanning wires GL through an insulating layer. A data wire drive circuit chip DD is connected to the end of each data wire DL. A wire inspection terminal (not shown) is formed also at the end on the opposite side of the end to which the data wire drive circuit chip DD for data wires DL is connected.

On the other hand, a color filter for a plurality of colors (normally red, green, and blue) is formed on the main surface of the second substrate SUB2. The second substrate SUB2 is laminated on the first substrate SUB1, the substrates being bonded with sealing agent SL. In this case, liquid crystal is injected from a notch made at a part of the sealing agent SL and then the notch is sealed with sealing agent STP.

With an active-matrix type liquid crystal display panel, since a thin-film transistor is formed near each intersection of the scanning wires GL and data wires DL on the first substrate SUB1, this substrate is also referred to as thin-film transistor substrate. Furthermore, since the color filter is formed on the second substrate SUB2, this substrate is also referred to as color filter substrate.

FIG. 5 is a diagram illustrating a condition wherein inspection probes are contacted with the wire inspection terminals to inspect disconnection of scanning wires. A plurality of inspection probes PB arranged in a row are lowered and then contacted with the contacts for inspection probe of the wire inspection terminals CKP included in the first substrate SUB1, as shown by an arrow, to inspect the presence of disconnection by use of a measuring apparatus (not shown). A technique related to such disconnection inspection is disclosed in JP-A-2001-324721.

SUMMARY OF THE INVENTION

FIG. 6 is a diagram illustrating a structure of a conventional wire inspection terminal of a scanning wire, with which an inspection probe is contacted for disconnection inspection; and a mechanism for damaging the scanning wire due to the contact of the inspection probe.

FIG. 6 explains disconnection inspection of a scanning wire formed on a thin-film transistor substrate SUB1 which is a first substrate. FIG. 6A is an enlarged view of a portion of a wire inspection terminal GL-P, which is circled and indicated by the arrow A. FIG. 6B is a cross-sectional view taken along the X-X' line of FIG. 6A. A wide portion prepared at the end of the scanning wire (gate wire) GL forms the wire inspection terminal (pad) GL-P on the main surface of the thin-film transistor substrate SUB1 suitably made of a glass plate.

An insulating film composed of a gate insulating film GI and a protection film PAS is formed on the gate wire GL and the wire inspection terminal GL-P, i.e., the wide portion. On the upper surface of the wide portion GL-P, the insulating film is partially removed to form a concave portion at which the top surface of the wide portion GL-P is exposed. A transparent conductive film suitably made of ITO is formed on the insulating film composed of the gate insulating film GI and the protection film PAS, including the concave portion on the top surface of the wide portion, i.e., the wire inspection terminal GL-P. A concave portion DNT is formed on the transparent conductive film TCF, the concave portion DNT being used as a contact portion with an inspection probe.

As shown in FIG. 5, using the concave portion DNT of the transparent conductive film TCF as a contact portion with an inspection probe, the inspection probe is contacted with the contact portion with an inspection probe to perform measurement. In order to ensure contact and avoid measurement error by the variation of contact resistance between inspection probes, pressure is applied to the inspection probes in the direction indicated by the arrow in FIG. 5 so that a certain degree of pressure is applied to the transparent conductive film TCF. Therefore, a crack SC may be made on the transparent conductive film TCF.

If a crack SC is made on the transparent conductive film TCF and humidity permeates the film from the crack, it reacts with a metal of the wire inspection terminal GL-P directly thereunder to generate a gas. This gas permeates the liquid crystal layer to generate gas bubbles, resulting in display failure. When the longitudinal dimension of the scanning wire of the transparent conductive film TCF is 0.20 mm, for example, the size of the crack SC is about 0.020 mm.

An object of the present invention is to provide a liquid crystal display device wherein the generation of gas bubbles by the contact of the inspection probe is prevented to restrain display failure.

In accordance with an embodiment of the present invention, there is provided a liquid crystal display device comprising a liquid crystal display panel which includes a liquid crystal layer encapsulated in an opposing gap between main surfaces of the first and second substrates, wherein a plurality of scanning wires and a plurality of data wires are formed on the main surface of the first substrate, the data wires intersecting with the scanning wires through an insulating layer; one end of a scanning wire has a wide portion; the wide portion includes a transparent conductive film which is electrically connected with the wide portion through an opening prepared in the insulating layer as the upper layer of the scanning wire, and has an extending portion on the insulating layer at a position not overlapped with the scanning wire; and the extending portion of the transparent conductive film is used as a contact portion with an inspection probe, to which an inspection probe is applied.

In accordance with another embodiment of the present invention, there is provided a liquid crystal display device comprising a liquid crystal display panel which includes a liquid crystal layer encapsulated in an opposing gap between main surfaces of the first and second substrates, wherein a plurality of scanning wires and a plurality of data wires are formed on the main surface of the first substrate, the data wires intersecting with the scanning wires through an insulating layer; a wide portion is formed at one end of a scanning wire; the wide portion has an opening at the central part thereof; an insulating layer is arranged in the opening; the wide portion includes a transparent conductive film that covers the upper layer of the wide portion including the opening and is electrically connected with the wide portion; and the position of the transparent conductive film, arranged as the upper layer of the opening prepared in the insulating film, is used as a contact portion with an inspection probe, to which an inspection probe is applied.

In accordance with still another embodiment of the present invention, there is provided a liquid crystal display device comprising a liquid crystal display panel which includes a liquid crystal layer encapsulated in an opposing gap between main surfaces of the first and second substrates, wherein a plurality of scanning wires and a plurality of data wires are formed on the main surface of the first substrate, the data wires intersecting with the scanning wires through an insulating layer; a wide portion is formed at one end of a scanning wire; an insulating layer is arranged at the central part of the wide portion; the wide portion includes a transparent conductive film that covers the upper layer of the wide portion and is electrically connected with the wide portion; and the position of the transparent conductive film, arranged as the upper layer of the insulating layer arranged at the wide portion of the transparent conductive film, is used as a contact portion with an inspection probe, to which an inspection probe is applied. It may be possible that the insulating layer be composed of a plurality of laminated insulating layers.

With the above-mentioned configurations, even if a crack is made at the contact portion with an inspection probe by the contact of the inspection probe, humidity does not reach the wiring layer under measurement from the crack.

Since humidity which permeated the film from the crack made by the contact of the inspection probe does not reach the wiring layer, humidity does not affect the wiring layer under measurement resulting in no generation of gas bubbles as mentioned above.

DETAILED DESCRIPTION OF PREFERRED EMBODIMENTS

Embodiments of the present invention will be described with reference to the accompanying drawings.

First Embodiment

Figure 1A:
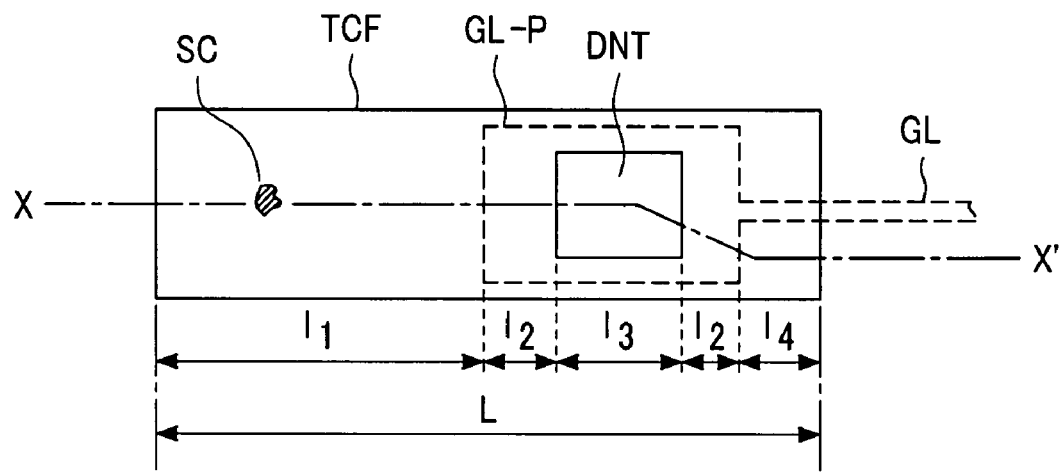
FIGS. 1A and 1B are diagrams showing a structure of a wire inspection terminal of a scanning wire and disconnection inspection by the contact of an inspection probe according to a first embodiment of the present invention.
Figure 1B:
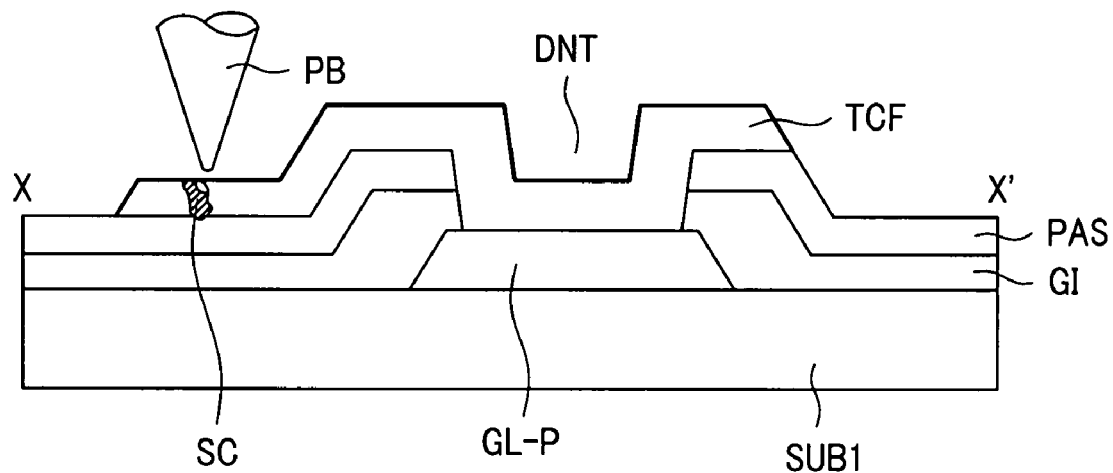

FIG. 1 is a diagram showing a structure of a wire inspection terminal of a scanning wire and disconnection inspection by the contact of an inspection probe according to a first embodiment of the present invention. Like FIG. 6, FIG. 1 explains disconnection inspection of a scanning wire formed on a thin-film transistor substrate SUB1 which is a first substrate. FIG. 1A is an enlarged view of a portion of a wire inspection terminal GL-P. FIG. 1B is a cross-sectional view taken along the X-X' line of FIG. 1A. A wire inspection terminal (pad) GL-P is formed at the end of a scanning wire (gate wire) GL on the main surface of the thin-film transistor substrate SUB1 suitably made of a glass plate.

Figure 6A:
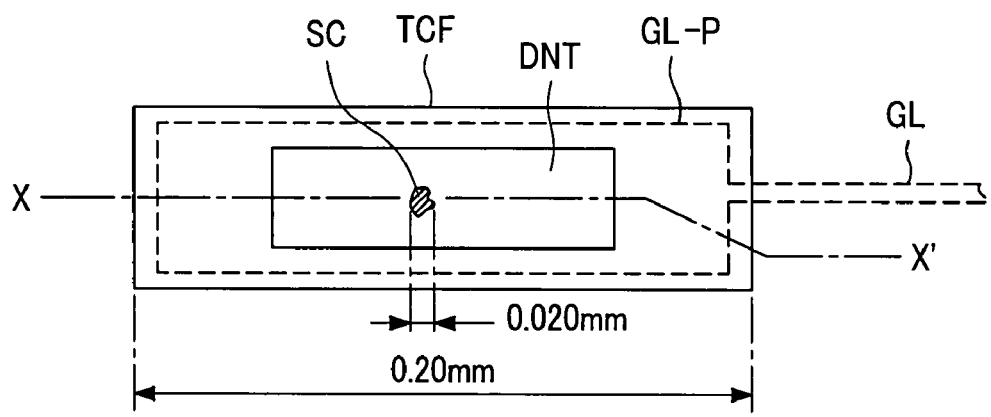
FIGS. 6A and 6B are diagrams illustrating a structure of a conventional wire inspection terminal of a scanning wire, with which an inspection probe is contacted for disconnection inspection; and a mechanism for damaging the scanning wire due to the contact of the inspection probe.
Figure 6B:
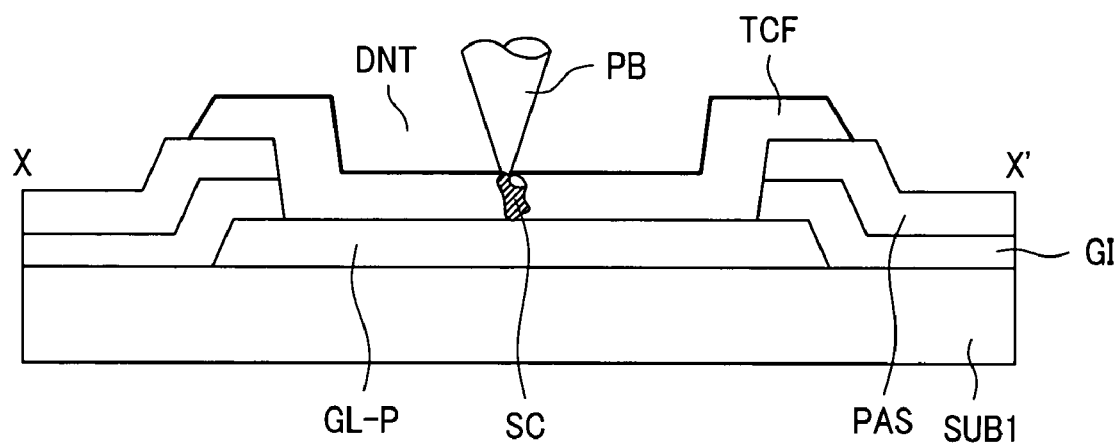

Like in FIG. 6, an insulating film composed of a gate insulating film GI and a protection film PAS is formed on the gate wire GL and the wire inspection terminal GL-P, i.e., the wide portion. On the upper surface of the wire inspection terminal GL-P, this insulating film is partially removed to form a concave portion DNT at which the top surface of the wire inspection terminal GL-P is exposed. A transparent conductive film TCF suitably made of ITO is formed as the upper layer of the insulating film composed of the gate insulating film GI and the protection film PAS, including the concave portion on the top surface of the wire inspection terminal GL-P. The transparent conductive film TCF is electrically connected with the wire inspection terminal GL-P at the concave portion DNT, and formed extending up to the upper layer of the above-mentioned gate insulating film GI and protection film PAS on the opposite side of the above-mentioned scanning wire GL of the wire inspection terminal GL-P. Disconnection inspection is performed using this extending portion as an inspection probe PB contact.

With the configuration of the first embodiment, wherein there is no metal wire as the lower layer of the transparent conductive film TCF, even if the inspection probe PB makes a crack SC on the transparent conductive film TCF, humidity permeating the film from the crack SC does not cause gas bubbles. Therefore, display failure is not caused by gas bubbles due to disconnection inspection, making it possible to obtain a highly reliable liquid crystal display device.

A dimensional aspect of the first embodiment will be explained below. When the longitudinal dimension of the scanning wire of the transparent conductive film TCF is L, for example, a length l1 of the above-mentioned extending portion to be contacted with the inspection probe PB is 0.1 mm. When lengths l2, l3, and l4 are 0.007 mm, 0.006 mm, and 0.005 mm, respectively, a longitudinal dimension L of the scanning wire of the transparent conductive film TCF will be L=I1+I2×2+I3+I4=0.125 mm. In FIG. 1, dimensions do not necessarily conform to the above-mentioned dimensional relations in order for easier understanding of shapes.

Furthermore, it may also be assumed that the transparent conductive film TCF extends toward the side of the scanning wire GL. In this case, however, since a scanning wire GL exists as the lower layer of the extending portion on the side of the scanning wire GL, the inspection probe PB will be contacted with a side different from the side of the scanning wire GL in order to avoid generation of gas bubbles. Actually, this is difficult because of the dimensions of the inspection probe PB and the contact thereof.

Second Embodiment

Figure 2A:
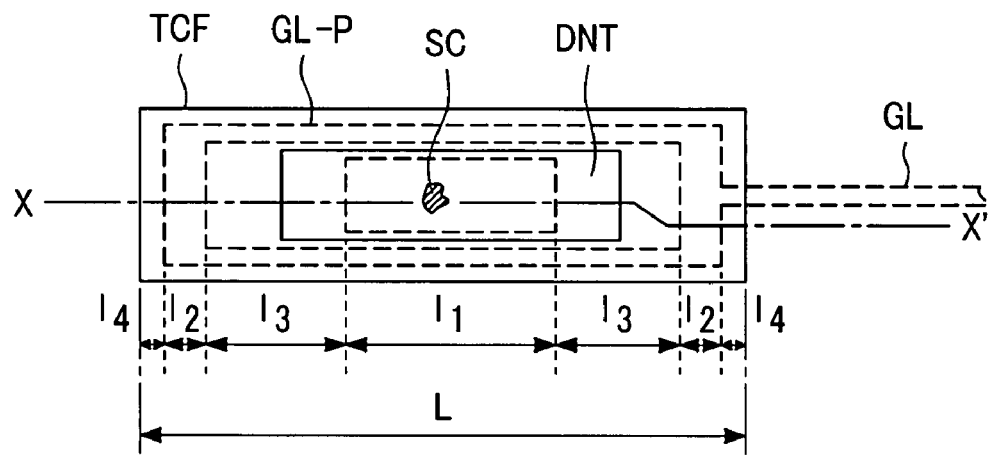
FIGS. 2A and 2B are diagrams showing a structure of a wire inspection terminal of a scanning wire and disconnection inspection by the contact of an inspection probe according to a second embodiment of the present invention.
Figure 2B:
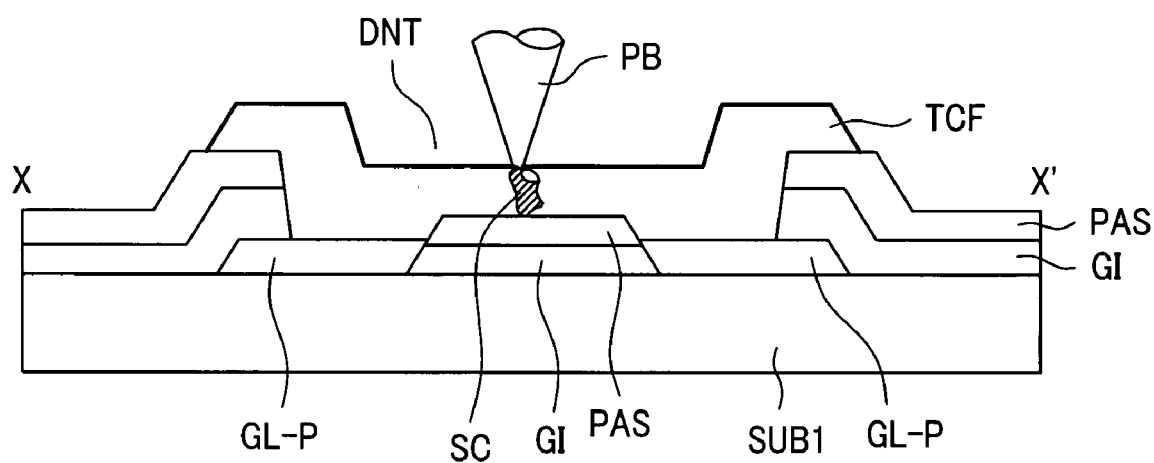

FIG. 2 is a diagram showing a structure of a wire inspection terminal of a scanning wire and disconnection inspection by the contact of an inspection probe according to a second embodiment of the present invention. Like FIG. 2, FIG. 1 explains disconnection inspection of a scanning wire formed on a thin-film transistor substrate SUB1 which is a first substrate. FIG. 2A is an enlarged view of a portion of a wire inspection terminal GL-P. FIG. 2B is a cross-sectional view taken along the X-X' line of FIG. 2A. A wire inspection terminal (pad) GL-P is formed at the end of a scanning wire (gate wire) GL on the main surface of the thin-film transistor substrate SUB1 suitably made of a glass plate.

Like FIG. 1, an insulating film composed of a gate insulating film GI and a protection film PAS is formed on the gate wire GL and the wire inspection terminal GL-P, i.e., the wide portion. Then, this insulating film has been removed at the central part of the wire inspection terminal GL-P. At the center of the wire inspection terminal GL-P, the metal film forming the wire inspection terminal GL-P is partially removed and, instead of this metal film, the insulating film composed of the gate insulating film GI and the protection film PAS is formed. At the top surface of the wire inspection terminal GL-P, a transparent conductive film TCF suitably made of ITO is formed along the lines of the concave portion formed by the removed insulating film. The transparent conductive film TCF is electrically connected with the wire inspection terminal GL-P at the periphery of the concave portion DNT. Disconnection inspection is performed using the transparent conductive film TCF, i.e., the upper layer of an insulating film composed of the gate insulating film GI and the protection film PAS, partially applied to the center of the wire inspection terminal GL-P as an inspection probe PB contact.

With the configuration of the second embodiment, wherein there is no metal wire as the lower layer of the transparent conductive film TCF, even if the inspection probe PB makes a crack SC on the transparent conductive film TCF, humidity permeating the film from the crack SC does not react with the metal wire generating no gas bubbles. Therefore, display failure is not caused by gas bubbles due to disconnection inspection, making it possible to obtain a highly reliable liquid crystal display device. Dimensions of each part in the second embodiment are also set in the same manner as the first embodiment.

Third Embodiment

Figure 3A:
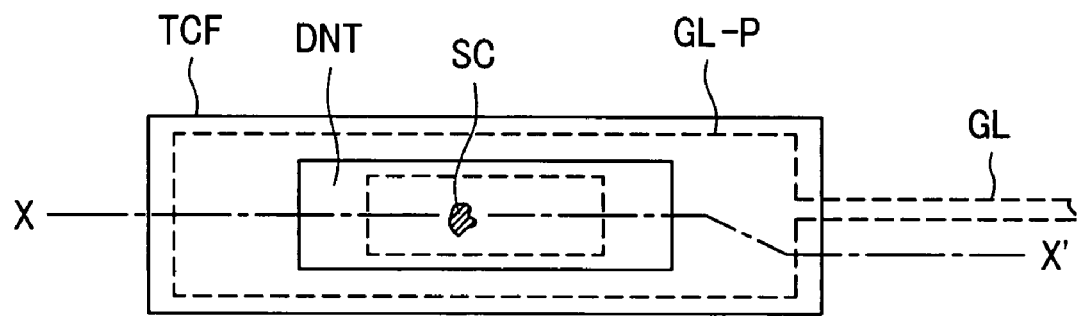
FIGS. 3A and 3B are diagrams showing a structure of a wire inspection terminal of a scanning wire and disconnection inspection by the contact of an inspection probe according to a third embodiment of the present invention.
Figure 3B:
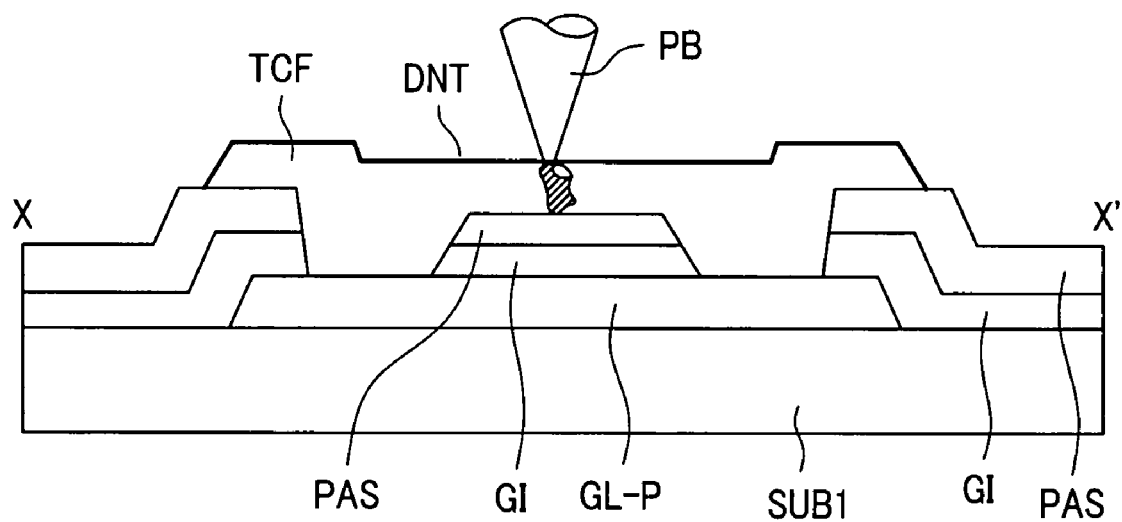
Figure 4:
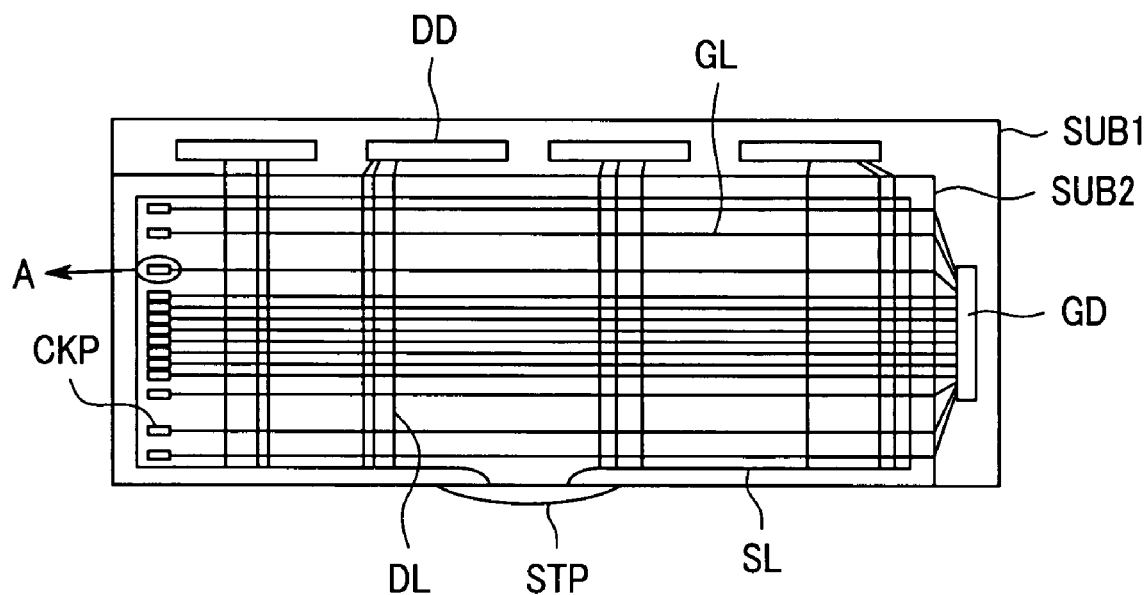
FIG. 4 is a schematic plan view showing a configuration of a liquid crystal display panel.
Figure 5:
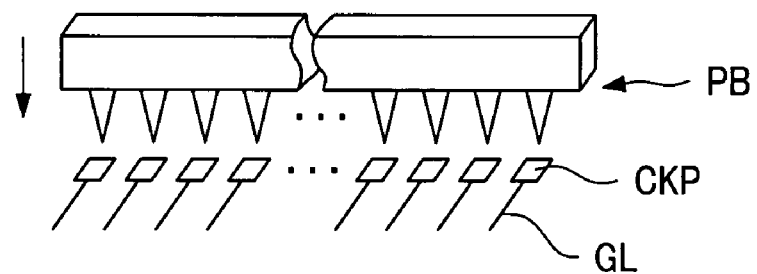
FIG. 5 is a diagram showing a condition wherein inspection probes are contacted with wire inspection terminals for disconnection inspection of scanning wires.

FIG. 3 is a diagram showing a structure of a wire inspection terminal of a scanning wire and disconnection inspection by the contact of an inspection probe according to a third embodiment of the present invention. Like FIG. 2, FIG. 3 explains disconnection inspection of a scanning wire formed on a thin-film transistor substrate SUB1 which is a first substrate. FIG. 3A is an enlarged view of a portion of a wire inspection terminal GL-P. FIG. 3B is a cross-sectional view taken along the X-X' line of FIG. 3A. A wire inspection terminal (pad) GL-P is formed at the end of a scanning wire (gate wire) GL on the main surface of the thin-film transistor substrate SUB1 suitably made of a glass plate.

Like FIG. 2, an insulating film composed of a gate insulating film GI and a protection film PAS is formed on the gate wire GL and the wire inspection terminal GL-P, i.e., the wide portion. Then, this insulating film has been removed from other than the central part and peripheral part of the wire inspection terminal GL-P. At the top surface of the wire inspection terminal GL-P, a transparent conductive film TCF suitably made of ITO is formed along the lines of the peripheral concave portion formed by the removed insulating film. The transparent conductive film TCF is electrically connected with the wire inspection terminal GL-P at the periphery of the concave portion DNT. Disconnection inspection is performed using the transparent conductive film TCF, i.e., the upper layer of an insulating film composed of the gate insulating film GI and the protection film PAS, laminated at the central part of the wire inspection terminal GL-P as an inspection probe PB contact.

With the configuration of the third embodiment, wherein an insulating film composed of the gate insulating film GI and the protection film PAS exists as the lower layer of the transparent conductive film TCF, even if the inspection probe PB makes a crack SC on the transparent conductive film TCF, humidity permeating the film from the crack SC neither reaches the metal wire nor reacts with the metal film, resulting in no generation of gas bubbles. Therefore, display failure is not caused by gas bubbles due to disconnection inspection, making it possible to obtain a highly reliable liquid crystal display device. Dimensions of each part in the third embodiment are also set in the same manner as the first and second embodiments.

The present invention is also applicable to disconnection inspection of data wires and other wires regardless of the gate wire.

What is claimed is:

1. A liquid crystal display device comprising a liquid crystal display panel which includes a liquid crystal layer encapsulated in an opposing gap between main surfaces of first and second substrates, wherein a plurality of scanning wires and a plurality of data wires are formed on the main surface of the first substrate, the data wires intersecting with the scanning wires through an insulating layer;

wherein an opening is formed at a first end of a scanning wire by removing the insulating film so that the scanning wire is exposed, and a transparent conductive film is formed so as to cover the opening and be electrically connected with the scanning wire; and wherein the transparent conductive film extends on the insulating film at the periphery of the opening, and the portion extending at the periphery of the opening film of the transparent conductive film is used as a contact portion with an inspection probe.

2. The liquid crystal display device according to claim 1, wherein a portion not overlapping with the scanning line of the transparent conductive film is used as a contact portion with an inspection probe.

3. The liquid crystal display device according to claim 1, wherein the first end of the scanning line is formed wider than other portions of the scanning line.

4. The liquid crystal display device according to claim 1, wherein
a scanning wire drive circuit chip is connected to a second end of each of the plurality of scanning wires.

5. The liquid crystal display device according to claim 1, further comprising a thin-film transistor near each intersection of the plurality of scanning wires and the data wires.

6. The liquid crystal display device according to claim 1, wherein
the contact portion with an inspection probe is formed outside the opening.

7. A liquid crystal display device comprising a liquid crystal display panel which includes a liquid crystal layer encapsulated in an opposing gap between main surfaces of first and second substrates;
wherein a plurality of scanning wires and a plurality of data wires are formed on the main surface of the first substrate, the data wires intersecting with the scanning wires through an insulating layer;
wherein an opening is formed at a first end of the scanning wire by removing the insulating film so that the scanning wire is exposed;
wherein the scanning line in the opening is partially removed and the insulating film is left at the portion where the scanning line has been removed;
wherein a transparent conductive film is formed so as to cover the opening and the insulating film left in the opening and be electrically connected with the scanning wire; and
wherein the transparent insulating film that covers the insulating film left in the opening is used as a contact portion with an inspection probe.

8. The liquid crystal display device according to claim 7, wherein
the first end of the scanning line is formed wider than the other portions of the scanning line.

9. The liquid crystal display device according to claim 7, wherein
a scanning wire drive circuit chip is connected to a second end of each of the plurality of scanning wires.

10. The liquid crystal display device according to claim 7, further comprising a thin-film transistor at each intersection of the plurality of scanning wires and the data wires.

11. The liquid crystal display device according to claim 7, wherein
the insulating film left in the opening exists at the center of the opening.

12. A liquid crystal display device comprising a liquid crystal display panel which includes a liquid crystal layer encapsulated in an opposing gap between main surfaces of a first and a second substrates;
wherein a plurality of scanning wires and a plurality of data wires are formed on the main surface of the first substrate, the data wires intersecting with the scanning wires through an insulating layer;
wherein an opening is formed at a first end of the scanning wire by removing the insulating film so that the scanning wire is exposed, and the insulating film is left partially in the opening;
wherein a transparent conductive film is formed so as to cover the opening and the insulating film left in the opening and be electrically connected with the scanning wire; and
wherein the transparent electrode insulating film that covers the insulating film left in the opening is used as a contact portion with an inspection probe.

13. The liquid crystal display device according to claim 12, wherein
the first end of the scanning line is formed wider than the width of other portions of the scanning line.

14. The liquid crystal display device according to claim 12, wherein
a scanning wire drive circuit chip is connected to a second end of each of the plurality of scanning wires.

15. The liquid crystal display device according to claim 12, wherein
a scanning wire drive circuit chip is connected to a second end of each of the plurality of scanning wires.

16. The liquid crystal display device according to claim 12, further comprising a thin-film transistor at each intersection of the plurality of scanning wires and the data wires.

* * * * *